US010023336B2

(12) United States Patent
Gomez

(10) Patent No.: US 10,023,336 B2
(45) Date of Patent: Jul. 17, 2018

(54) PRODUCE PACK ARRANGEMENT APPARATUS

(71) Applicant: Diogenes M. Gomez, Brampton (CA)

(72) Inventor: Diogenes M. Gomez, Brampton (CA)

(73) Assignee: DG National MFG Inc., Brampton, CA (US)

( * ) Notice: Subject to any disclaimer, the term of this patent is extended or adjusted under 35 U.S.C. 154(b) by 21 days.

(21) Appl. No.: 15/232,314

(22) Filed: Aug. 9, 2016

(65) Prior Publication Data
US 2018/0044045 A1 Feb. 15, 2018

(51) Int. Cl.
| | | |
|---|---|---|
| *B65G 15/00* | (2006.01) | |
| *B65G 37/00* | (2006.01) | |
| *B65G 47/24* | (2006.01) | |
| *B65B 35/58* | (2006.01) | |
| *B65G 47/244* | (2006.01) | |
| *G06K 9/32* | (2006.01) | |
| *G06K 9/46* | (2006.01) | |

(52) U.S. Cl.
CPC .............. *B65B 35/58* (2013.01); *B65G 15/00* (2013.01); *B65G 37/00* (2013.01); *B65G 47/244* (2013.01); *B65G 2201/0211* (2013.01); *B65G 2203/0225* (2013.01); *B65G 2203/041* (2013.01); *B65G 2811/0626* (2013.01); *G06K 9/3208* (2013.01); *G06K 9/4652* (2013.01); *G06K 2209/17* (2013.01)

(58) Field of Classification Search
CPC ........ B65B 35/58; B65G 15/00; B65G 37/00; B65G 47/244; B65G 2201/0211; B65G 2203/0225; B65G 2203/041; B65G 2811/0626; B65G 47/26; B65G 47/30; B65G 47/8884; G06K 9/3208
See application file for complete search history.

(56) References Cited

U.S. PATENT DOCUMENTS

| | | | | |
|---|---|---|---|---|
| 3,605,984 A | * | 9/1971 | Erekson et al. ......... | A23N 4/14 198/384 |
| 3,666,079 A | * | 5/1972 | Anderson ................ | A23N 3/00 198/386 |
| 4,726,898 A | * | 2/1988 | Mills ....................... | B07C 5/02 209/545 |
| 4,872,564 A | * | 10/1989 | van der Schoot ..... | A01K 43/00 198/387 |
| 5,855,270 A | * | 1/1999 | Throop .................. | A23N 15/00 198/387 |
| 5,904,236 A | * | 5/1999 | Affeldt .................... | B07C 5/02 198/460.1 |
| 6,691,854 B1 | | 2/2004 | de Greef | |
| 8,973,732 B2 | * | 3/2015 | Crescenzo ........... | B65G 47/248 198/384 |
| 9,364,020 B2 | | 6/2016 | Tao et al. | |
| 2009/0139840 A1 | * | 6/2009 | Begin .................. | B65G 47/244 198/617 |
| 2015/0081090 A1 | | 3/2015 | Dong | |

* cited by examiner

*Primary Examiner* — Mark A Deuble
(74) *Attorney, Agent, or Firm* — Millman IP Inc.

(57) ABSTRACT

Provided is a produce pack arrangement system. The produce pack arrangement system comprises a produce supply station, a produce orientation and assembly station, and a produce packaging delivery station. The produce orientation and assembly station is configured to receive produce from the produce supply station and orient a set group of produce according to a desired predetermined arrangement prior to release to the produce packing delivery station.

17 Claims, 15 Drawing Sheets

US 10,023,336 B2

PRODUCE PACK ARRANGEMENT APPARATUS

FIELD

The present disclosure relates to the field of produce packaging, and in particular to a system that counts and orients produce in a predefined arrangement for packaging.

BACKGROUND

The handling of fruit and vegetables in post-harvest packaging processes is still largely a manual procedure, requiring packaging workers to sort and assemble the product according to the desired count, variety and orientation. Worker involvement and direct handling of the produce has the potential to introduce undesirable and harmful contaminants. This is particular problematic where the product has already been subject to a clean-house process, where the produce may be washed/disinfected and protected (i.e. applied wax emulsion) prior to packaging.

While controlling the cleanliness of the packaging process with respect to direct worker contact should be achievable, it remains a goal that continues to challenge the food packaging industry. As such, there exists a need in the food packaging industry, in particular with respect to the packaging of fresh fruit and vegetable for a packaging process that is largely automated and involves less direct worker contact with the produce being processed and packaged

SUMMARY

According to an aspect of the disclosure, provided is a produce pack arrangement system. The produce pack arrangement system comprises a produce supply station, a produce orientation and assembly station, and a produce packaging delivery station. The produce orientation and assembly station is configured to receive produce from the produce supply station and orient a set group of produce according to a desired predetermined arrangement prior to release to the produce packing delivery station.

According to another aspect of the disclosure, provided is a produce orientation and assembly station. The produce orientation and assembly station comprises an assembly supply end configured to receive a set group of produce, an assembly discharge end configured to discharge the set group of produce to a subsequent produce packaging delivery station, and a conveyor assembly arranged to carry the set group of produce from the assembly supply end to the assembly discharge end. The station further comprises an orientation zone including an orientation element configured to rotate each item of produce in the set group of produce to a desired orientation, and a produce assembly zone including a staging assembly to move and arrange the set group of produce according to a preselected pack arrangement, the staging assembly being configured to discharge the set group of produce, once arranged, from the assembly discharge end to the subsequent produce packaging delivery station.

BRIEF DESCRIPTION OF THE DRAWINGS

The foregoing and other features and advantages will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

DETAILED DESCRIPTION

Specific embodiments of the present disclosure are now described with reference to the figures, wherein like reference numbers indicate identical or functionally similar elements. The following detailed description is merely exemplary in nature and is not intended to limit the disclosure or the application and uses of the disclosure. Furthermore, there is no intention to be bound by any expressed or implied theory presented in the preceding technical field, background, brief summary or the following detailed description.

Figure 1:
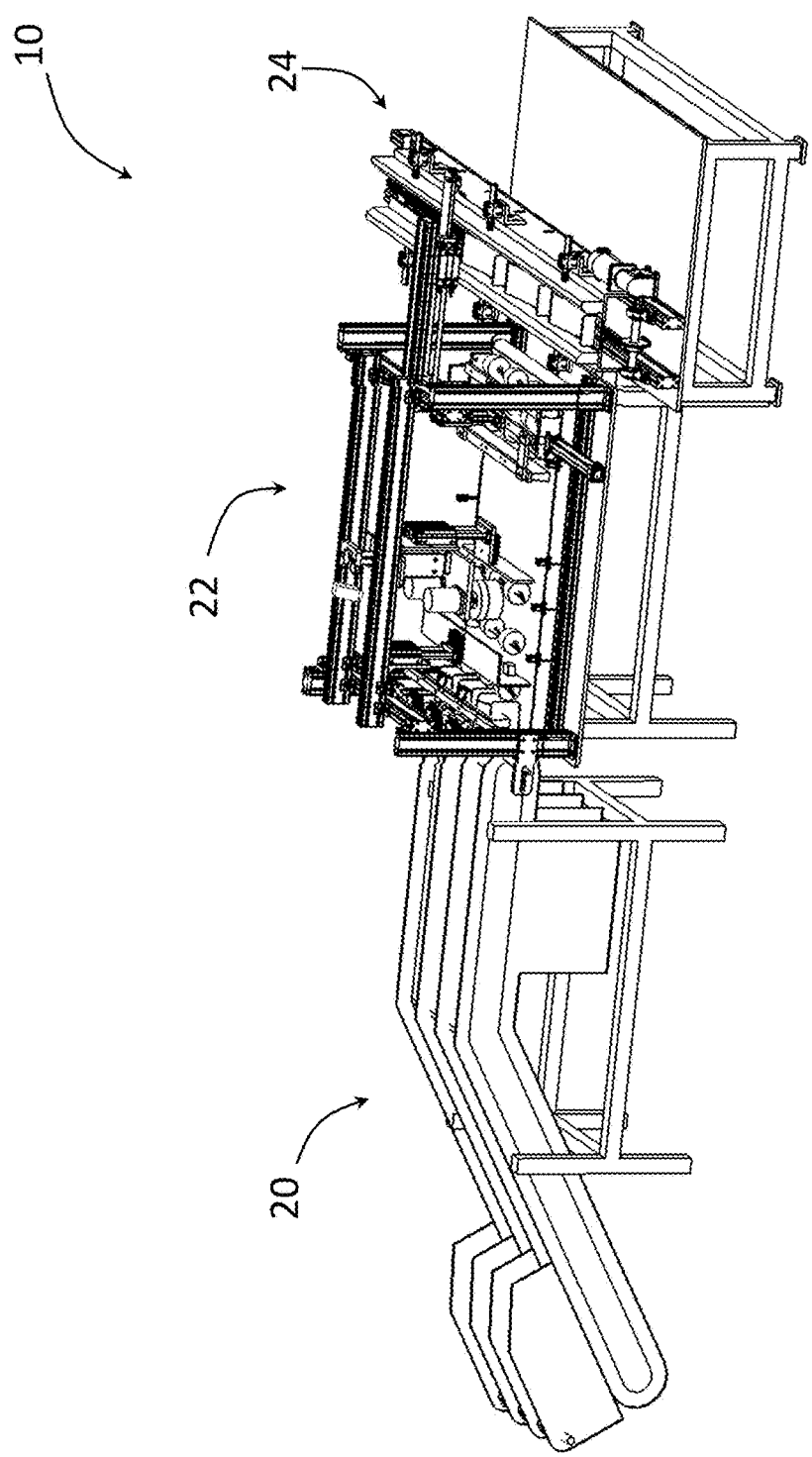
FIG. 1 is a perspective view of a produce pack arrangement system.
Figure 2:
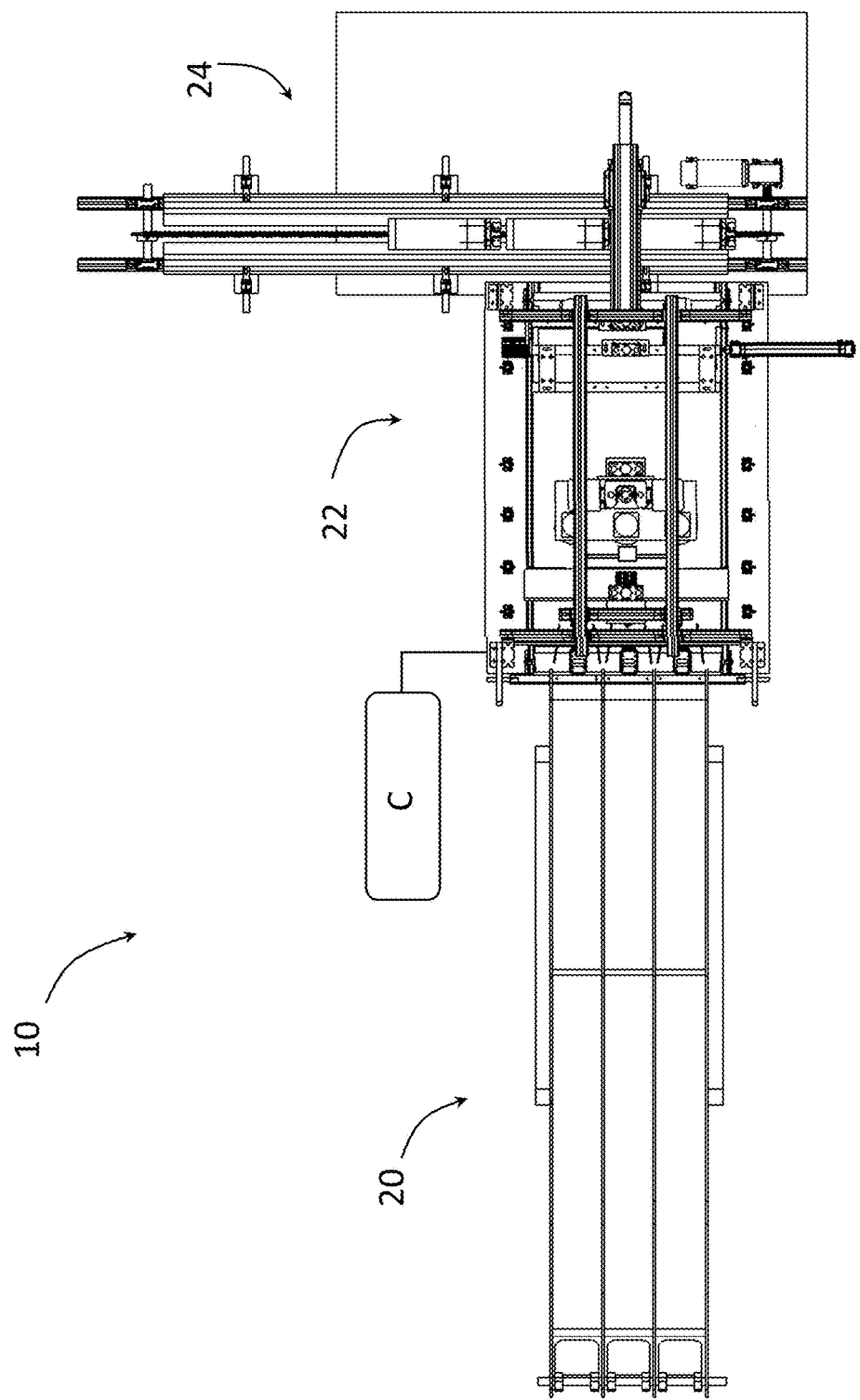
FIG. 2 is a top view of the produce pack arrangement system according to FIG. 1.

Referring now to FIGS. 1 and 2, shown is a pack arrangement system 10 configured to receive and orient set groupings of produce (i.e. peppers) into a predetermined arrangement. The pack arrangement system 10 includes a produce supply station 20, a produce orientation and assembly station 22 and a produce packaging delivery station 24. Suitable produce that may be processed with the pack arrangement system 10 includes both fruits and vegetables. The pack arrangement system 10 is particularly well suited to process fruits and vegetables that are generally round in shape, although irregular and elongated-shaped produce (i.e. generally rectangular or tube-shaped) may also be processed. Exemplary fruits include, but are not limited to apples, pears, oranges, peaches, nectarines, and plums. Exemplary vegetables include but are not limited to peppers, tomatoes, and squash. The pack arrangement system 10 is designed to receive a supply of produce, and prearrange a set count of produce in a set orientation (i.e. stems pointed inward) prior to packaging.

Produce Supply Station

Figure 3:
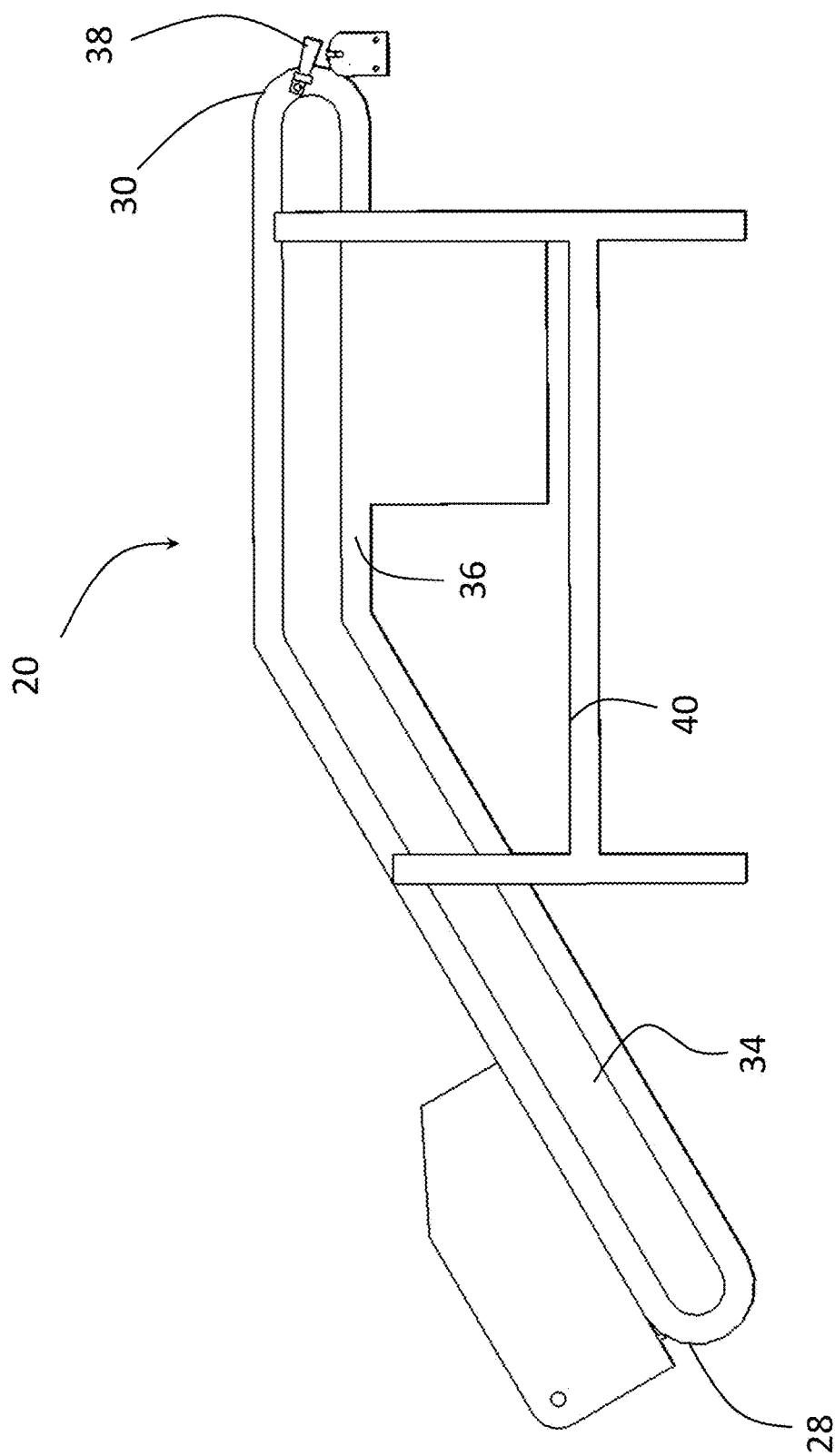
FIG. 3 is a side view of the produce supply station of the produce pack arrangement system according to FIG. 1.
Figure 4:
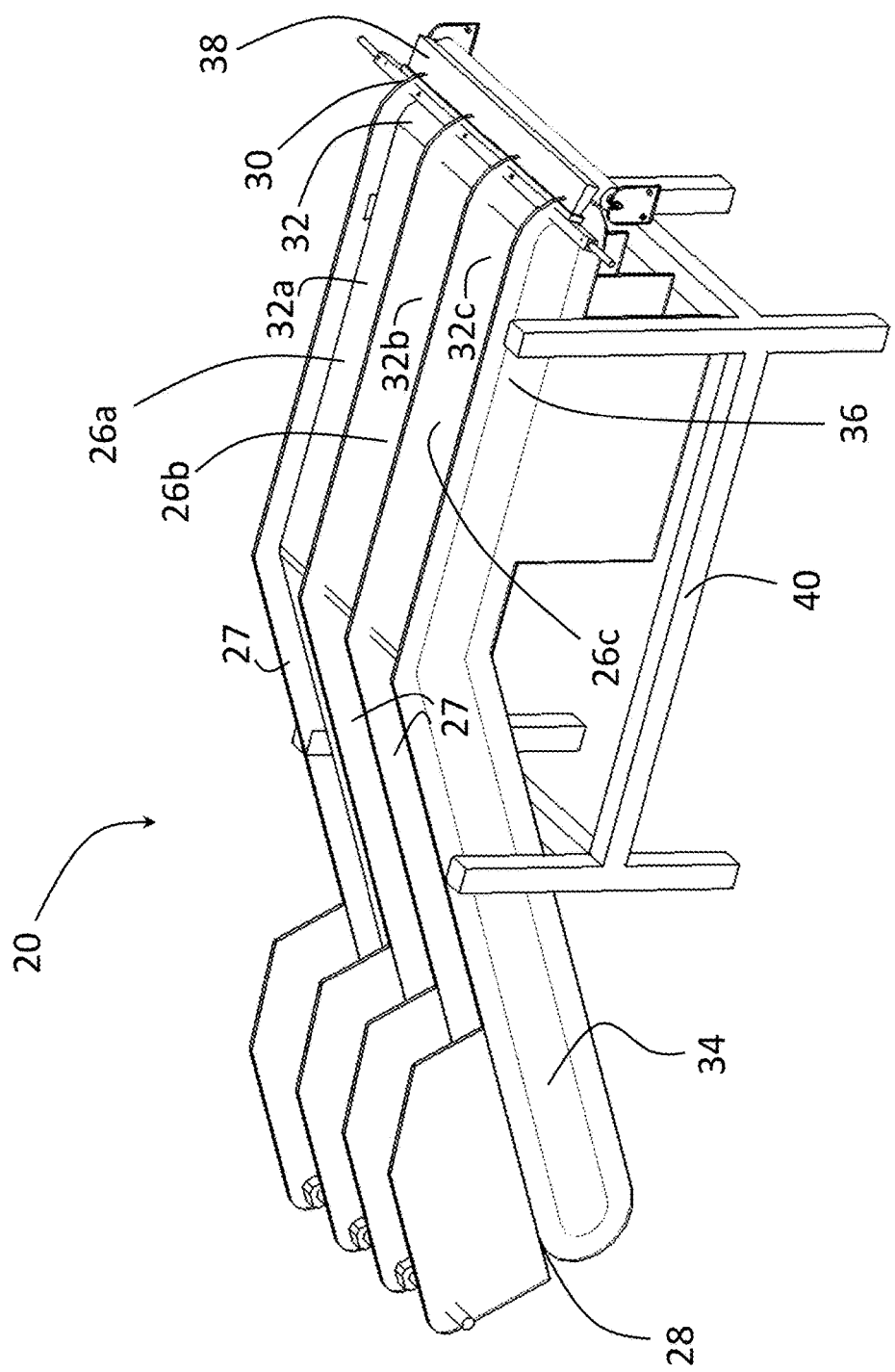
FIG. 4 is a perspective view of the produce supply station of the produce pack arrangement system according to FIG. 1.
Figure 5:
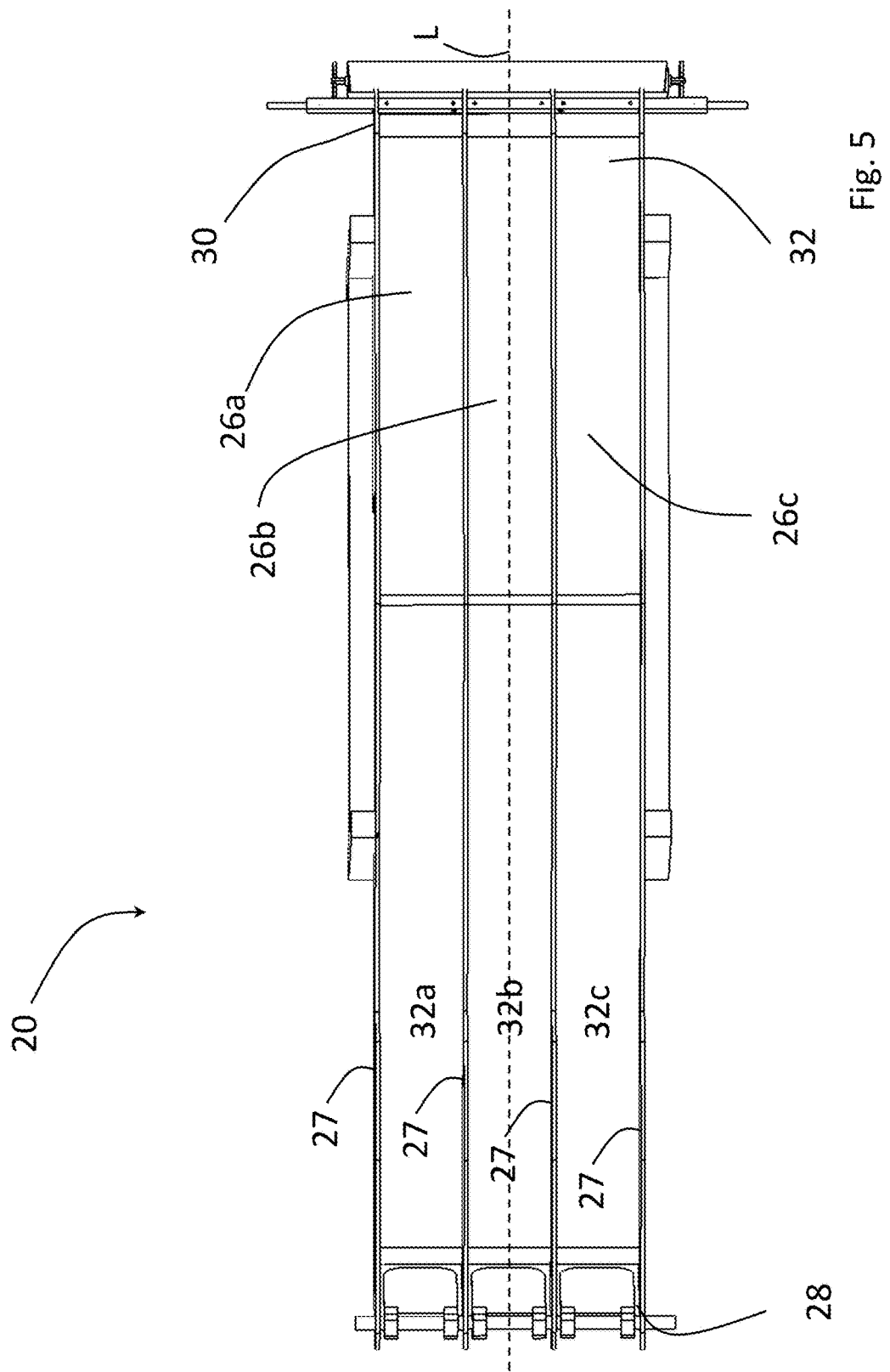
FIG. 5 is a top view of the produce supply station of the produce pack arrangement system according to FIG. 1.

In the embodiment shown (see FIGS. 3 to 5), the produce supply station 20 is arranged with 3 parallel produce supply chutes 26a, 26b, 26c (collectively produce supply chute 26). Each produce supply chute 26 extends from a feeder supply end 28 to a feeder discharge end 30 along a longitudinal direction L of the produce supply station 20. Each produce chute 26 is associated at the feeder supply end 28 with a respective produce supply bin (not shown) containing the produce to be packaged. In some arrangements, each produce supply chute 26 may be associated with a separate produce supply bin, to enable the delivery of three types (i.e. variety, colour, etc.) of produce. For example, the produce supply station 20 may be set up to receive red peppers in produce supply chute 26a, green peppers in produce supply chute 26b, and yellow peppers in produce supply chute 26c. In another arrangement, the produce supply chutes 26a, 26b, 26c may collectively be associated at the feeder supply end 28 with a common produce supply bin where the packaging operation selected does not involve produce of different types. For example, the produce supply station 20 may be set up to feed each of produce supply chutes 26a, 26b, 26c with one type of pepper (i.e. a green pepper), from a common produce supply bin. It will be appreciated that variations on the arrangement of the produce supply bins relative to the produce supply chutes is possible. For example, in some arrangements, two produce supply bins may be provided. In such an arrangement, one of the produce supply bins would feed an individual produce supply chute (i.e. produce supply chute 26a) while the second produce supply bin would feed two produce supply chutes (i.e. produce supply chutes 26b, 26c). In yet another arrangement, one or more of the produce supply chutes 26 may be deactivated, with only the active produce supply chutes being operatively associated with a respective produce supply bin.

Each produce supply chute 26 is bordered longitudinally by walls 27, so as to prevent lateral movement of produce from one supply chute to another. In some embodiments, the walls 27 bordering each supply chute may be dimensioned with a height that is at least twice the average diameter of the produce being processed, so to prevent a portion of the produce (i.e. a stem) from catching upon the wall during transport. Each produce supply chute 26 includes a suitable conveyor 32 to transport the produce from the feeder supply end 28 to the feeder discharge end 30. The conveyor 32 may be provided in the form of an endless belt. To assist in transporting the produce via the conveyor 32, the endless belt forming each conveyor 32 may include a plurality of spaced-apart transverse conveyor tabs (otherwise known as flutes or vertical separators) that arrange the produce into set zones (i.e. produce receptacles) on the moving conveyor 32. The conveyor 32 provided for each produce supply chute 26 may be operatively associated with a dedicated motor unit, to activate and provide independent control to each conveyor 32 during operation of the produce supply station 20. In this arrangement, the produce supply chute 26a would be associated with the conveyor 32a, the produce supply chute 26b would be associated with the conveyor 32b, and the produce supply chute 26c would be associated with the conveyor 32c, where each of the conveyors 32a, 32b, 32c are independently controllable relative to each other. In some embodiments, the conveyor 32 for each produce supply chute 26 is in fact common, in that they share the same endless belt and motor unit. In this arrangement, the conveyor 32 would extend across the full width of the produce supply station 20, that is across all produce supply chutes 26a, 26b, 26c, and be powered via a single motor unit.

As shown, proceeding from the feeder supply end 28 towards the feeder discharge end 30, the produce supply station 20 includes a ramped supply section 34 and a generally horizontal supply section 36. The ramped supply section 34 is set at an incline where the conveyor 32 is angled upwardly towards the horizontal supply section 36. As such, the ramped supply section 34 positions the feeder supply end 28 of the produce supply station 20 at a position that is lower than the generally horizontal supply section 36, to facilitate the loading of the conveyor 32 with produce.

At the feeder discharge end 30 of the produce supply station 20 there is located a produce drop dampener 38. The produce drop dampener 38 is positioned to receive produce released from the feeder discharge end 30 of the horizontal conveyor section 36. The produce drop dampener 38 may be provided in the form of a rubberized or otherwise impact absorbing material that reduces the likelihood of damage to the produce received thereon. The produce drop dampener 38 may be angled downwards relative to the direction of produce movement (i.e. longitudinal direction L) to promote a passive (i.e. rolling) movement of the produce into the produce orientation and assembly station 24.

The ramped supply section 34 and the generally horizontal supply section 36 of the produce supply station 20 are mounted on a common frame 40. It will be appreciated that the supply of the produce to the produce orientation and assembly station 22 may be accomplished in a number of ways, and that the arrangement shown of the produce supply station 20 is merely one example of how the produce may be carried to the produce orientation and assembly station 22. In another embodiment, the produce supply station 20 may comprise a series of subunits (i.e. separated ramped and horizontal conveyor sections) that are arranged to supply the produce to the produce orientation and assembly station 22.

It will be appreciated that while the produce supply station 20 is shown as having 3 produce supply chutes 26, other arrangements of the produce supply station may have fewer (i.e. two produce supply chutes) or more (i.e four produce supply chutes), as well as the corresponding conveyors. It will also be appreciated that the produce supply station 20 may be configured with supply chutes and corresponding conveyors with differing width, so as to accommodate a packaging process that includes produce having different shapes and/or sizes. For example, one embodiment of the produce supply station 20 may have supply chutes 26a and 26b configured with a first width suitable for processing a medium-sized tomato, while supply chute 26c is configured with a second width that is wider than the first width in order to process a large-sized pepper. The length of the produce supply station 20 may be governed by the desired loading capacity. A higher loading capacity may enable an operator to attend to other functions and inspections on the pack arrangement system 10.

Produce Orientation and Assembly Station

Figure 6:
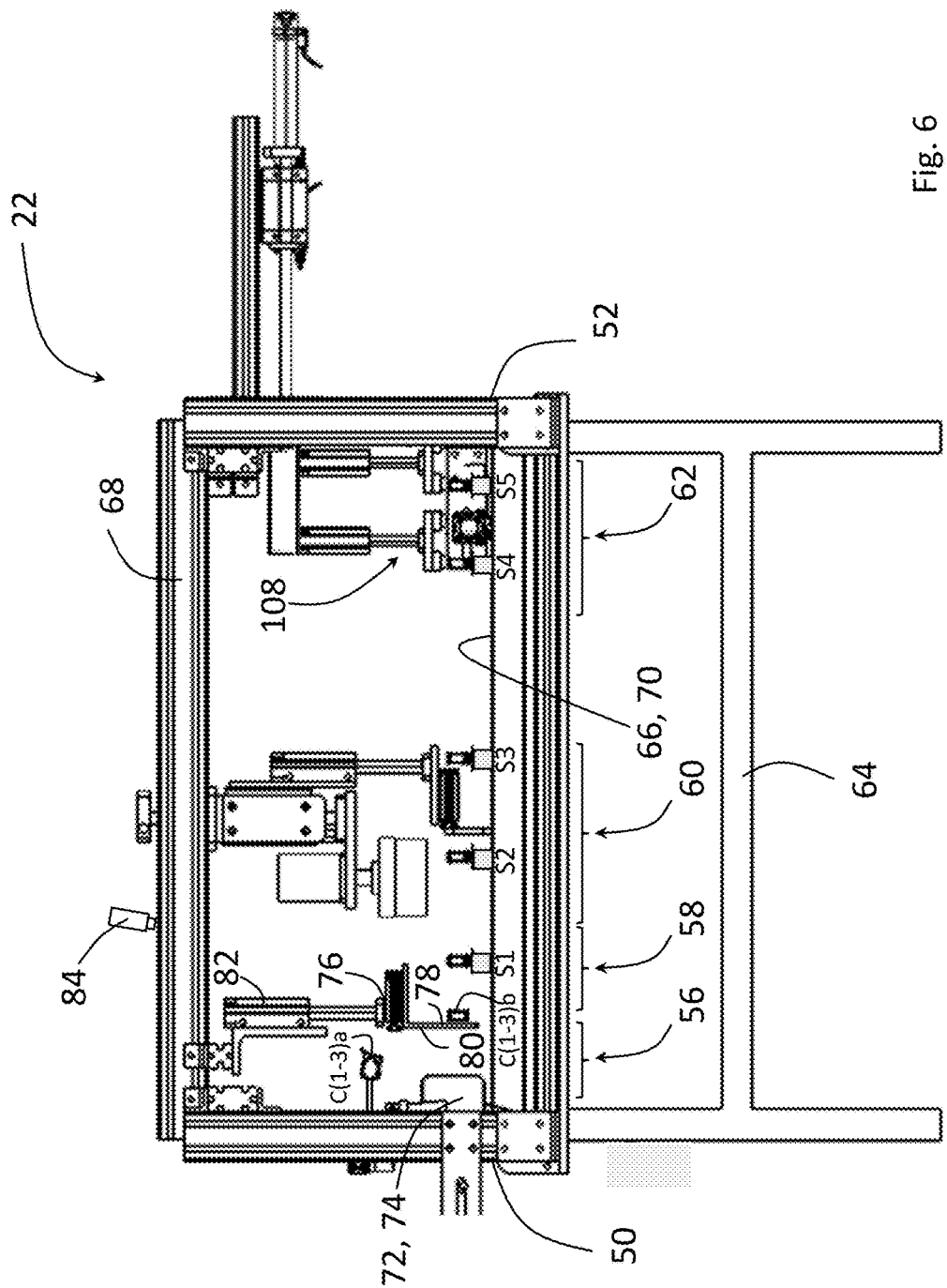
FIG. 6 is a side view of the produce orientation and assembly station of the produce pack arrangement system according to FIG. 1.
Figure 7:
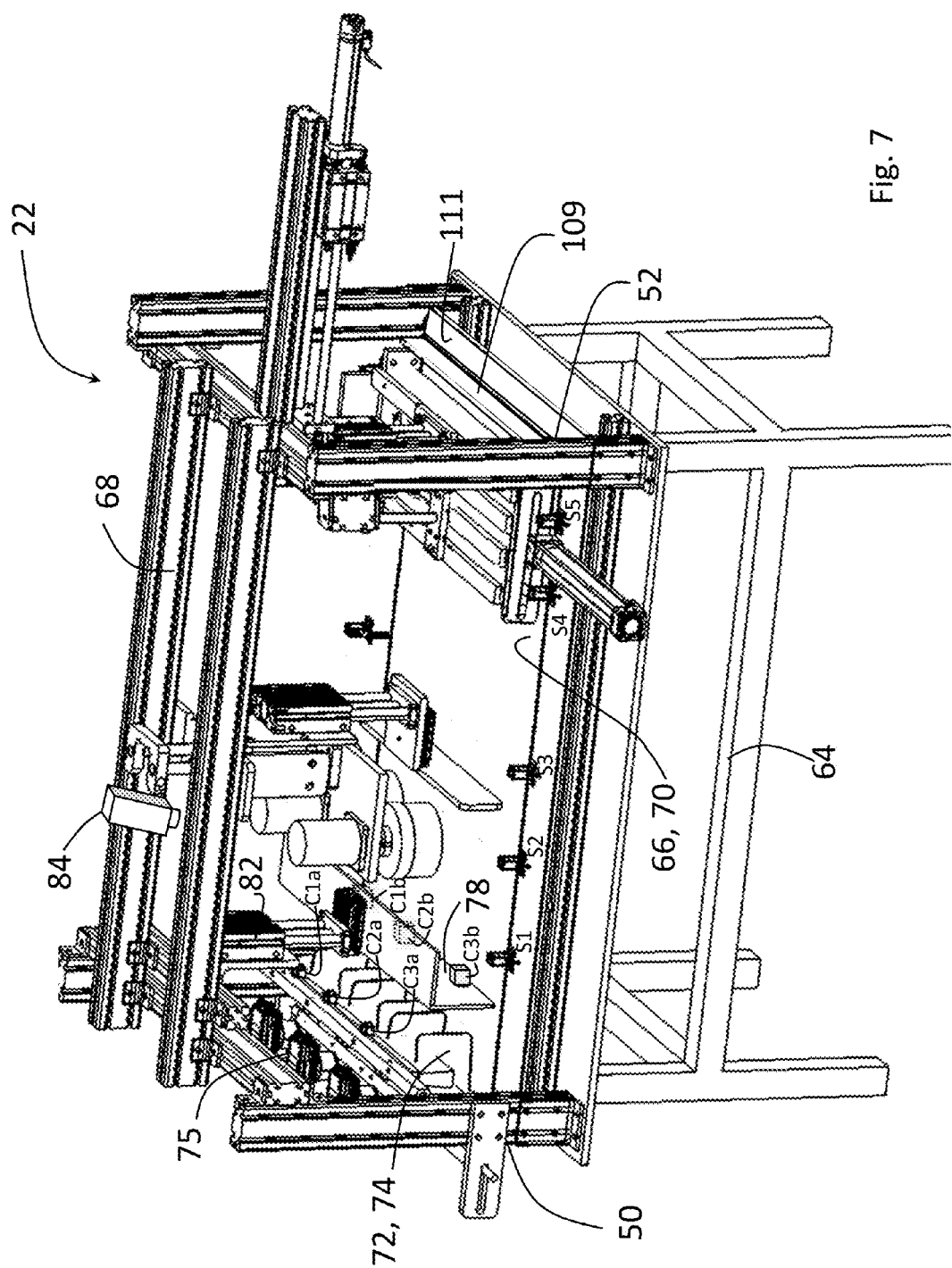
FIG. 7 is a perspective view of the produce orientation and assembly station of the produce pack arrangement system according to FIG. 1.
Figure 8:
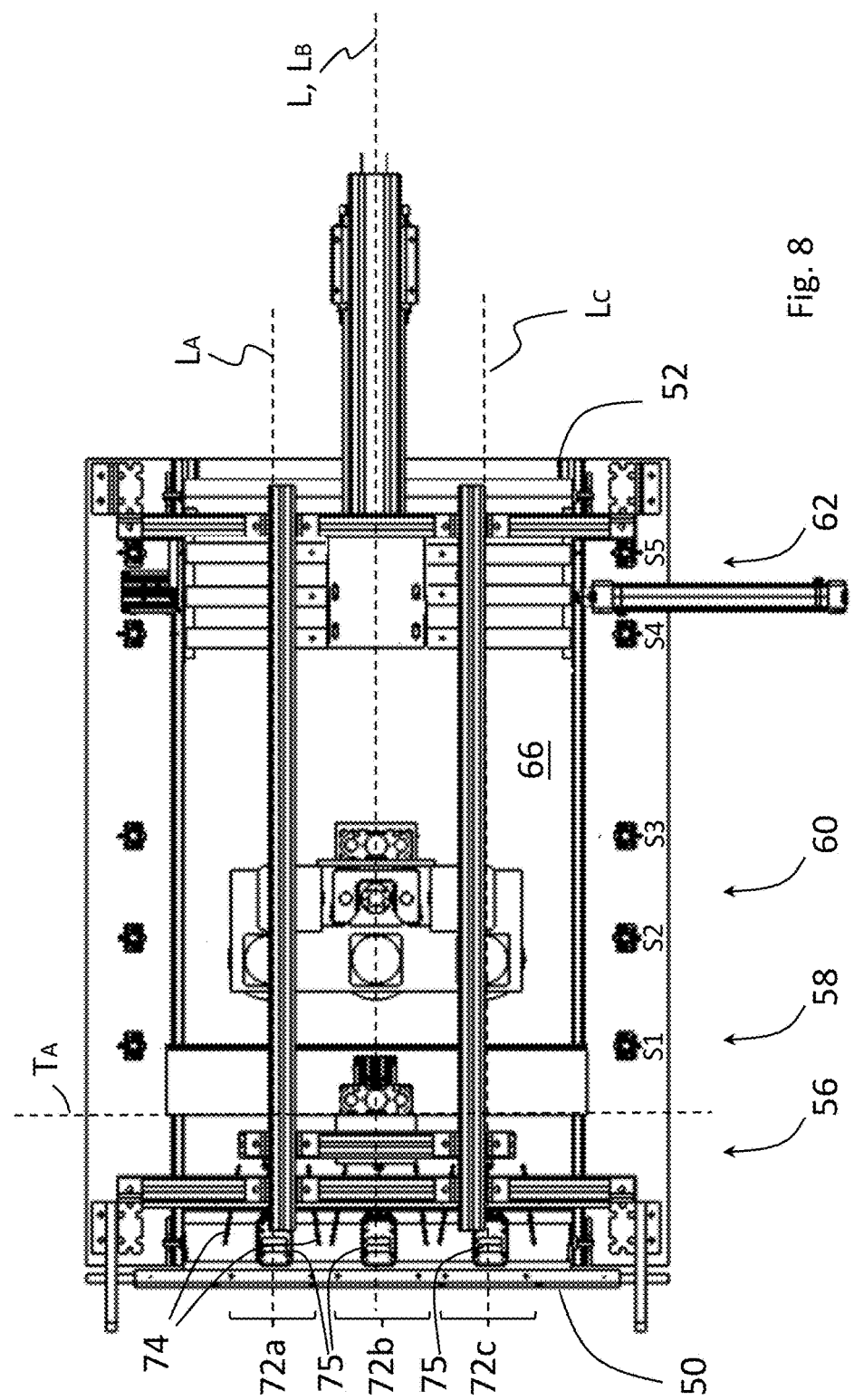
FIG. 8 is a top view of the produce orientation and assembly station of the produce pack arrangement system according to FIG. 1.

Produce carried by the produce supply station 20 and which exits at the feeder discharge end 30 is received by the produce orientation and assembly station 22 (herein referred to as the assembly station 22, See FIGS. 6 to 8). The assembly station 22 includes an assembly supply end 50, and an assembly discharge end 52 opposite thereof. The assembly station provides a produce alignment zone 56 and a produce imaging zone 58. The assembly station 22 also provides a produce orientation zone 60 and a pre-pack assembly zone 62.

The assembly station 22 includes a bottom frame 64 that supports a conveyor assembly 66, and a top frame 68 to support top-mounted station components. The conveyor assembly 66 is configured to carry the produce from the assembly supply end 50 to the assembly discharge end 52 of the assembly station 22, along the longitudinal direction L. The conveyor assembly 66 may be provided in the form of an endless belt 70 that is supported at each end of the assembly station 22 upon respective rollers (not shown). The conveyor assembly 66 will additionally include a motor unit (not shown) operably connected to the endless belt 70 to power and move the endless belt around the respective end rollers.

The produce alignment zone 56 includes a stationary centering fixture 72 positioned to receive the produce supplied by each produce supply chute. Accordingly, in the embodiment shown, the alignment zone 56 includes 3 stationary centering fixtures 72a, 72b, 72c (collectively centering fixture 72) positioned over the moveable conveyor assembly 66, and arranged to center the produce along longitudinal alignment lines $L_A$, $L_B$, and $L_C$, respectively. Each stationary centering fixture 72 may be provided as a pair of opposing walls 74 that taper and urge the produce towards the desired alignment line ($L_A$, $L_B$, and $L_C$). The pair of opposing walls 74 of each stationary centering fixture 72 also serve to rotate the produce to generally align the long axis of the produce to the respective alignment line ($L_A$, $L_B$, and $L_C$). Rotation of the produce by each stationary centering fixture 72 is generally more evident with produce having an elongate shape, such as certain varieties of pepper, such as Shepherd peppers.

The produce alignment zone 56 also serves to position the set count of produce on an axis generally perpendicular to the longitudinal direction L, so as to facilitate imaging of the produce in the produce imaging zone 58. Accordingly, where 3 items of produce (i.e. peppers) are being processed, the produce alignment zone 56 serves to position the 3 items along transverse axis $T_A$. The produce alignment zone 56 includes a produce alignment gate 76. As shown, the produce alignment gate 76 is supported by the top frame 68. The alignment gate 76 is vertically moveable from a first lowered position, as when used to engage and position the produce, and a second raised position to permit passage of the produce once positioned. The alignment gate 76 is also moveable horizontally so as to disengage (i.e. retract) from the produce prior to being vertically moved from the first lowered position to the second raised position. The alignment gate 76 includes a transverse alignment bar 78 having a produce stop surface 80. The alignment gate 76 is operably associated with a vertical movement alignment gate actuator 82, and a horizontal movement alignment gate actuator 83. The alignment gate actuators 82, 83 are shown as supported by the top frame 68. The alignment gate actuators 82, 83 may be any suitable actuator including but not limited to a pneumatic actuator or an electric actuator. The transverse alignment bar 78 is generally made of a rigid material, including but not limited to plastic or metal. The transverse alignment bar 78 is sized to span the total width of the produce alignment zone 56, that is across the entirety of the conveyor assembly 66 of the assembly station 22. The transverse alignment bar 78 may include an engagement ramp 85 to prevent the produce from rolling upon contact with the transverse alignment bar 78.

Continuing forward on the longitudinal line L, adjacent the produce alignment zone 56 is the produce imaging zone 58. The produce imaging zone 58 serves to digitally image and detect the orientation of incoming produce. As shown, the produce imaging zone 58 includes a camera 84 supported above the produce imaging zone 58. In this embodiment, the camera 84 is supported by the top frame 68. The camera 84 is configured to image all produce passing through the produce imaging zone 58 from the produce alignment zone 56. The camera 84 is connected to a suitable controller C which can analyze the produce image and make a determination of the produce orientation.

Figure 9:
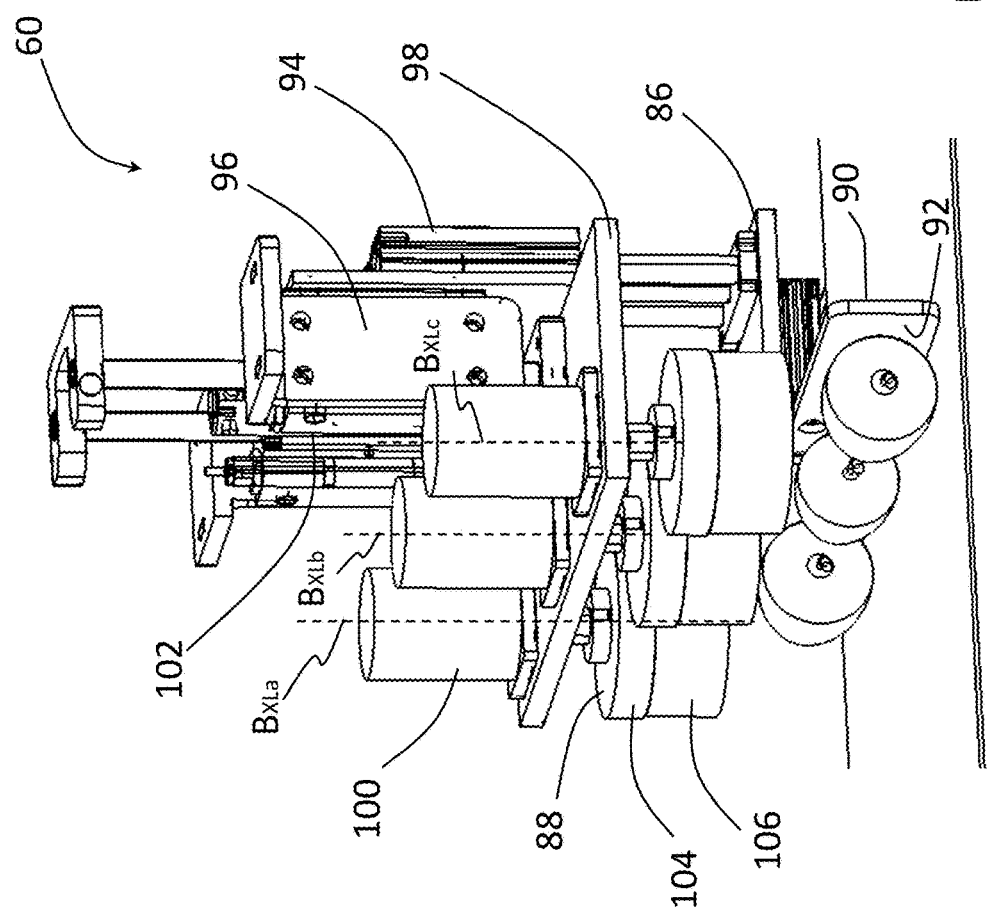
FIG. 9 is a perspective view of the produce orientation zone of the produce orientation and assembly station of the produce pack arrangement system according to FIG. 1.

Adjacent the produce imaging zone 58 in the forward direction along the longitudinal line L is the produce orientation zone 60. The produce orientation zone 60 is shown in FIG. 9 (partially isolated for clarity). The produce orientation zone 60 provides a second alignment gate 86. The second alignment gate 86 serves to position the produce under a respective orientation element. Accordingly, where the system is arranged with three produce supply chutes that deliver three items of produce for packaging, the produce orientation section will provide three orientation elements, corresponding to alignment lines $L_A$, $L_B$, and $L_C$. As shown, the orientation element is provided in the form of an orientation brush 88. In other embodiments, the orientation element may be provided in the form of a passive or active gripper. An active gripper may provide a plurality of pneumatically or electrically driven fingers that are operable to engage and grip the produce to effect a desired range of motion in the produce, for example to alter its orientation based on an assessment made in the produce imaging zone. Where a gripper is used, the grippers are generally sized to be about twice the average height of the product, although grippers sized to be larger or smaller than this general guideline may be used.

Both the second alignment gate 86 and the orientation brush 88 are supported by the top frame 68. In the embodiment shown, the second alignment gate 86 is vertically moveable from a first lowered position, as when used to engage and position the produce, and a second raised position to permit passage of the produce once aligned. The second alignment gate 86 includes a transverse alignment bar 90 having a produce stop surface 92. The second alignment gate 90 is connected to an alignment gate actuator 94 supported by an orientation zone support 96. As shown, the orientation zone support 96 is connected to the top frame 68 (as shown in FIGS. 6 to 8). The alignment gate actuator 94 may be any suitable actuator including but not limited to a pneumatic actuator or an electric actuator. The transverse alignment bar 90 is generally made of a rigid material, including but not limited to plastic or metal.

Attached to the orientation zone support 96 is a brush support plate 98, which in turn supports a motor 100 and the orientation brush 88 corresponding to each alignment line $L_A$, $L_B$, and $L_C$. Each orientation brush 88 is mounted on the brush support plate 98, and is configured to be rotatable around a respective brush axis ($B_{XLa}$, $B_{XLb}$, $B_{XLc}$—collectively $B_X$). Accordingly, each orientation brush 88 may be mounted using a suitable bearing or bushing member. Each orientation brush 88 is operably connected to the powered shaft of the respective motor 100 that powers the rotation of the orientation brush 88 according to instruction received from the controller C. The rotational control (i.e. rotation speed and angle of rotation) of the orientation brush 88 may be provided by the controller C based on the captured images provided by the camera 84 in the produce imaging zone 58.

To permit for positioning of the produce under the respective orientation brush 88, and to permit for release of the produce once the desired orientation is achieved, the brush bracket 98 may be vertically moveable from a first lowered position, to a second raised position. The ability to vertically move the brush bracket 98 and associated components may be achieved using a suitable brush bracket actuator 102. The brush bracket actuator 102 may be any suitable actuator including but not limited to a pneumatic actuator or an electric actuator.

In the embodiment shown, the orientation element is provided in the form of a brush having a generally circular cross section in the direction transverse to the rotational axis $B_X$. The orientation brush 88 includes a brush base 104 and a plurality of brush bristles 106 extending downwardly therefrom, to engage the produce and urge it rotationally in the desired direction. The brush bristles are arranged so as to present a central concave depression or void on the underside of the orientation brush 88. By shaping the contact region of the brush bristles in this way, the number of bristles capable of engaging the produce is increased, without increasing the contact forces applied to the surface of the produce. This serves to minimize the potential damage caused by handling the produce during processing. Suitable materials for the brush bristles 106 include, but are not limited to, both synthetic and natural bristles. An exemplary synthetic material for the brush bristles would be nylon.

Figure 10A:
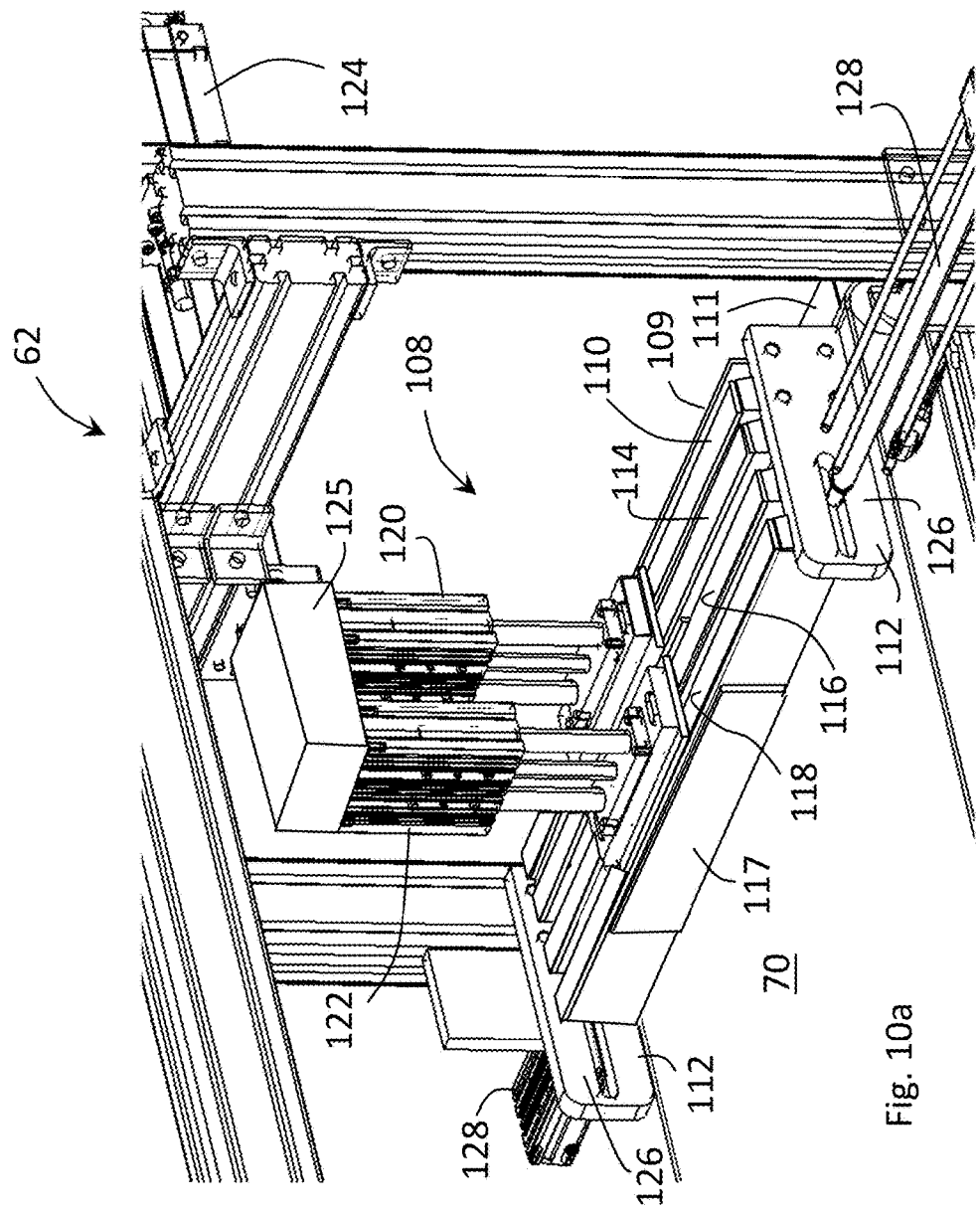
FIG. 10a is a perspective view of the produce pre-pack assembly zone of the produce orientation and assembly station of the produce pack arrangement system according to FIG. 1.

Continuing in the longitudinal direction L, adjacent the produce orientation zone 60 in the forward direction is the produce assembly zone 62. The produce assembly zone 62 includes a staging assembly 108 (see FIGS. 10*a* and 10*b*) that permits for produce movement/manipulation in both the longitudinal direction L towards the produce packaging delivery station 24, and displacement transversely relative thereto. As such, the staging assembly 108 provides at least one transverse staging member 110 moveable both vertically as well as in the longitudinal direction L. The staging assembly 108 also provides at least one longitudinal push member 112 which is moveable in the transverse direction relative to the longitudinal direction L. Each of the transverse and longitudinal push members 110, 112 are operably connected to actuators that permit for the required movement.

Figure 10B:
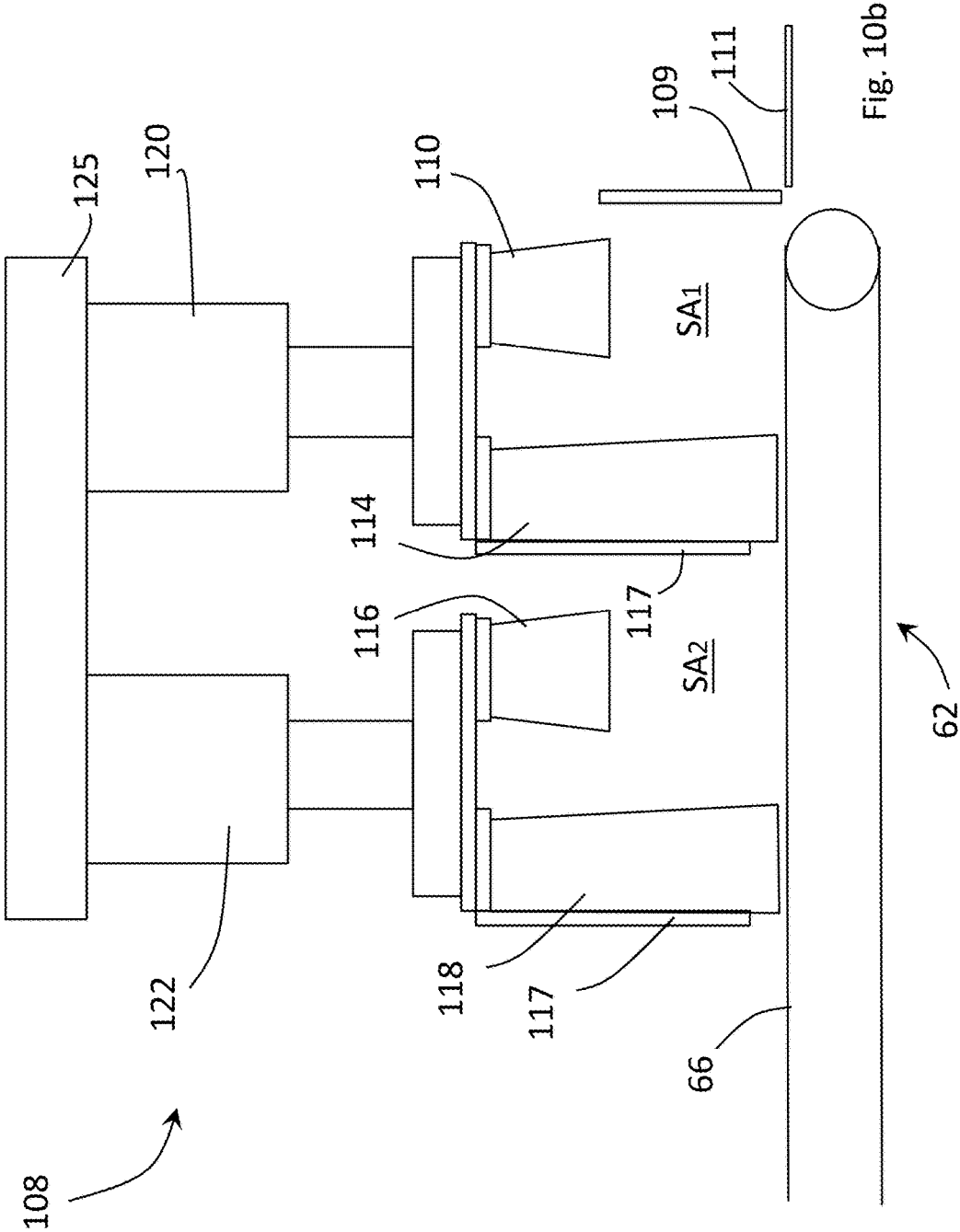
FIG. 10b is a side schematic view of the produce pre-pack assembly zone of the produce orientation and assembly station of the produce pack arrangement system according to FIG. 1.

In the embodiment shown, the produce assembly zone 62 provides a transverse staging end stop 109, a first staging member 110, a second staging member 114, a third staging member 116, and a forth staging member 118. The first and second staging members 110, 114 are connected to a first staging member actuator 120 to enable vertical movement from a first produce engaging/push position, and second produce receiving position. The third and forth staging members 116, 118 are connected to a second staging member actuator 122 to enable vertical movement from a first produce engaging/push position, and a second produce receiving position. The staging end stop 109 is connected to a staging end stop actuator (not shown) to enable vertical movement from a first produce stop position to a second produce release position. The staging end stop 109 is generally configured to lower vertically relative to the adjacent conveyor assembly 66 and a staging shelf 111. The end stop 109 and the first, second, third, and forth staging members 110, 114, 116, 118 are arranged in spaced-apart relationship, with the gap-spacing therebetween being sized to receive the produce being packaged, generally without interference between adjacent staging members. The established distance between adjacent staging members may also account for the orientation direction required, in particular when the produce being assembled are elongated in shape. Accordingly, the end stop 109 and the first, second, third, and forth staging members 110, 114, 116, 118 define staging areas $SA_1$, $SA_2$ as shown in FIG. 10*b*. The first, second, third and forth staging members 110, 114, 116, 118 are collectively connected to a third staging member actuator 124 (see FIG. 10*a*) that enables movement of the staging members in the longitudinal direction L. The third staging member actuator 124 is supported on the top frame 68. The first and second staging member actuators 120, 122 are supported on an actuator block 125 operably connected to the third actuator 124. As such, the first and second staging member actuators 120, 122 are moved longitudinally by the third actuator 124, therein moving the first, second, third and forth staging members as required.

The first, second, third and forth staging members 110, 114, 116, 118 are generally formed of a stiff material capable of manipulating/directing the produce. In one embodiment, the staging members 110, 114, 116, 118 are provided as stiff bristle brushes where the bristles have sufficient stiffness to retain and impart motion in the produce when necessary. In another embodiment, bristle brush forming the staging members 110, 114, 116, 118 may additionally include a stiff backing plate 117 (i.e. formed of plastic) to ensure the required stiffness when pushing the produce in the longitudinal direction L. As shown in FIG. 10*b*, the first and third staging members 110, 116 are configured to engage the top-side of the produce being arranged, while the second and forth staging members 114, 118 are configured to engage the side of the produce being arranged. As such, the first and third staging members 110, 116 are provided with shorter bristles compared to the second the forth staging members 114, 118.

The longitudinal push member 112 is moveable in the transverse direction relative to the longitudinal direction L. The longitudinal push member 112 may be provided as a plate 126 and is connected to a push member actuator 128 that permits the required transverse movement of the longitudinal push member 112. In the embodiment shown, a pair of longitudinal push members 112 are provided, each being independently operable. The pair of longitudinal push members 112 are provided on opposing sides of the endless belt 70 of the conveyor assembly 66. In general, each of the pair of longitudinal push members 112 displace transversely a distance that accords to the desired packaging length. In doing so, the longitudinal push member 112 push through the bristle brushes forming the staging members 110, 114, 116, 118, so as to arrange and ready the produce for release to the produce packaging delivery station 24. Where the staging members are provided with a stiff backing plate 117, the stiff backing plate 117 will be sized to accord to the desired length of the packaging, so as to avoid interfering with the transverse movement of the longitudinal push members 112.

With the arrangement of the produce assembly zone 62, produce can be received in at least one of the staging areas $SA_1$, $SA_2$ provided between the first, second, third and forth staging members 110, 114, 116, 118. The produce can be urged to move in both the longitudinal direction L, as well as transversely relative thereto, so as to arrange the oriented produce prior to discharge to the produce packaging delivery station 24.

It will be appreciated that the various actuators provided in the produce assembly zone 62 may be any suitable actuator including but not limited to a pneumatic actuator or an electric actuator.

The produce assembly zone 62 is the final zone of the produce assembly station 22. Discharge from the produce assembly zone 62, that is to say discharge from the assembly discharge end 52 of the produce assembly station 22, moves the oriented and assembled grouping of produce over staging shelf 111 to the produce packaging delivery station 24.

Figure 11:
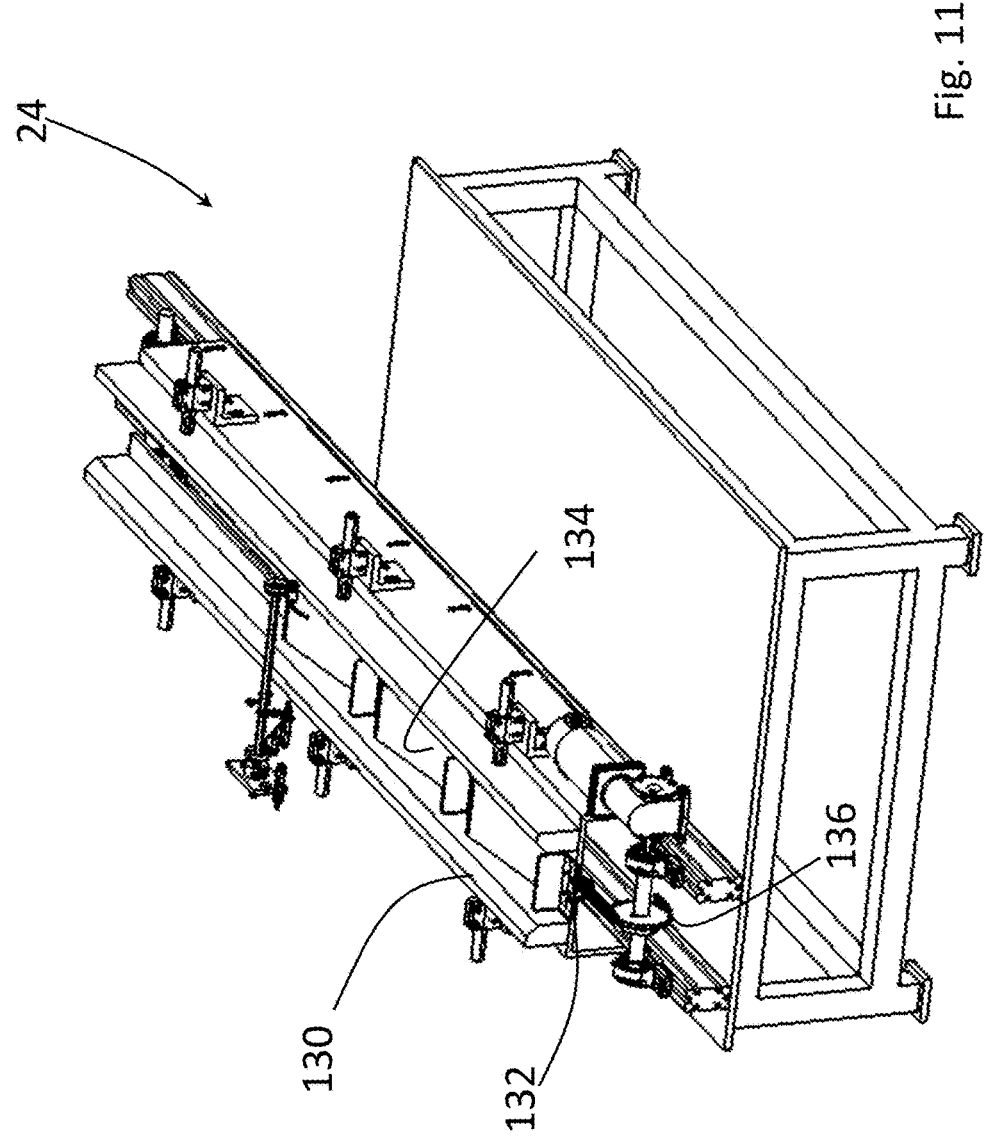
FIG. 11 is a perspective view of the produce packaging delivery station of the produce pack arrangement system according to FIG. 1.

The produce packaging delivery station 24 is generally provided in the form of a horizontal flow-wrap machine (not shown). The produce assembly station 22 delivers the oriented and assembled grouping of produce to an infeed portion 130 (see FIG. 11) of the flow wrap machine. The infeed portion 130 will generally provide a motorized conveyor 132 having a series of produce retainer segments 134 configured to operate as an endless belt around rollers 136 provided at each end of the infeed portion 130. It will be appreciated that the infeed portion 130 shown in FIG. 11 is exemplary, and that the infeed portion 130 may take on a variety of forms, depending on the produce being packaged, and the producing wrapping machine (i.e. horizontal flow-wrap machine or otherwise) being used.

The produce pack arrangement system 10 includes a controller C for control and operation of the system. For example, the controller C may be a programmable logic controller (PLC) or a printed circuit board (PCB) carrying various processing and/or memory devices, etc.). The controller C may include computer-readable storage media that contains executable instructions for causing the various operable components of the system 10 to perform the required operations.

The controller C receives vision data from the camera 84 to determine the orientation of the produce. The camera 84 may be a digital camera, a digital video camera, or any alternative image capture device capable of viewing the produce imaging zone 58. Suitable cameras include the Cognex In-sight 7000 (Cognex Corporation) series of Integrated Vision System cameras, although other camera types may be suitably implemented. The camera 84 provides visual data to the controller C, which then uses programmed algorithms to determine the orientation of the incoming produce. The controller C may also use the image data to assess presence/location of the produce in the imaging zone. Accordingly, the controller C detects, analyzes, and classifies geometrical information and/or surface characteristics or features of the incoming produce based on the imaging data, and determines the rotation required to orient the produce to the desired predetermined orientation. While the produce imaging zone 58 is shown as having one camera (camera 84) that captures an image(s) of all produce in the imaging zone, it will be appreciated that in some embodiments, the imaging zone 58 will include multiple cameras in order to view the produce from multiple angles. In this way, the controller C has additional imaging data from which to determine the required rotation to achieve the desired predetermined orientation.

In some embodiments, the image recognition software may include a series of algorithms programmed into the image capture camera 84. In other embodiments, the software may be programmed into the controller C. The software may be programmed to detect certain features of the incoming produce. For example, the controller C may be programmed to detect characteristics including, but not limited to colour, colour transition (i.e. green to red), shape (i.e. curved ends, triangular shape, pointed end, etc.), and irregular/diverging elements (i.e. stems). The detection of certain features may also be based on methodologies such as edge detection, as well as machine learning, where multiples of reference images are provided to the controller C for comparative analysis to incoming image data.

The produce pack arrangement system 10 may incorporate a variety of presence cameras and sensors operably associated with the controller C to permit for produce detection in the various processing zones. In the embodiment shown, for example having regard to FIG. 6, the assembly station 22 incorporates the following presence cameras and sensors:

Presence camera 75a to inspect produce received from produce chute 26a

Presence camera 75b to inspect produce received from produce chute 26b

Presence camera 75c to inspect produce received from produce chute 26c

Presence cameras C1a/C1b for alignment line $L_A$

Presence cameras C2a/C2b for alignment line $L_B$

Presence cameras C3a/C3b for alignment line $L_C$

Imaging zone presence sensor S1

Orientation zone presence sensor S2

Crush prevention sensor S3

Assembly zone SA1 sensor S4

Assembly zone SA2 sensor S5.

Sensors S1, S2, S3, S4, and S5 are arranged in pairs positioned on opposing sides of the conveyor assembly 66.

Presence cameras 75a, 75b, 75c (collectively presence camera 75) serve to inform the controller C that produce has been received from the produce supply station 20. The detection of the presence or absence of produce can also assist in the detection of produce in images captured via camera 84 and processed by controller C. As shown for example in FIG. 7, a presence camera 75 is provided to inspect the feeder discharge end 30 of each produce chute 26 of the produce supply station 20. Accordingly, presence camera 75a inspects produce chute 26a, presence camera 75b inspects produce chute 26b, and presence camera 75c inspects produce chute 26c. The presence camera 75 serves to inform the controller C whether or not an item of produce has been received from the produce supply station 20. Where the presence camera 75 detects an item of produce, the controller C may instruct the respective conveyor 32 of that produce chute to stop. The controller C may be programmed to control each conveyor 32 such that the conveyors operate until a specific condition is achieved. For example, the controller C may be programmed to operate each conveyor until each respective presence camera 75 detects produce at the feeder discharge end 30 of each produce chute 26, meaning the required count (i.e. 3 produce items) is achieved. An exemplary camera sensor for this application would include an IFM Object Recognition Camera—Model O2V100 (IFM Efector Canada Inc.). Although shown as being operably mounted to the assembly station 22, it will be appreciated that the presence camera 75 provided for each produce chute 26 may be suitably mounted on the produce supply station 20.

The alignment zone 56 includes a pair of presence cameras set for each alignment line ($L_A$, $L_B$, $L_C$). As produce is received from the produce supply station 20, the produce moves forward into the alignment zone 56. In order for the controller C to know that produce is present in the alignment zone 56, in particular at the produce alignment gate 76, the pair or presence cameras set for each alignment line is used. Two cameras (presence cameras C1a/C1b for alignment line $L_A$, presence cameras C2a/C2b for alignment line $L_B$, presence cameras C3a/C3b for alignment line Lc) are used so as to ensure detection of the produce, in particular when the produce in question may be oriented in such a way (i.e. stem forward against the alignment gate 76) that a top mount presence camera may fail to see it. As such, the two presence cameras operate cooperatively to image the produce from both above (presence cameras C1a, C2a, C3a) and from a forward (viewing rearward) position (presence cameras C1b, C2b, C3b) to determine when the produce is present. On detection via the pair of presence cameras that produce is present in the alignment zone 56, the controller C can trigger activation of the produce alignment gate 76, that is to horizontally retract it, and then raise it to permit passage of the produce to the subsequent imaging zone 58.

The imaging zone presence sensor S1 serves to inform the controller C that produce has arrived in the imaging zone 58. On detection via the imaging zone presence sensor S1 that produce is present in the imaging zone 58, the controller C can trigger an image capture event from the camera 84.

The orientation zone presence sensor S2 serves to inform the controller C that produce has arrived in the orientation zone 60. On detection via the orientation zone presence sensor S2 that produce is present in the orientation zone, the second alignment gate 86 and orientation elements (i.e. orientation brushes 88, grippers, etc.) may be moved into position and activated to align and rotate the produce to the desired predetermined orientation.

The crush prevention sensor S3 located between the produce orientation zone 60 and the pre-pack assembly zone 62 serves to inform the controller C that produce is passing through this area, so as to avoid a crush event due by the second alignment gate 86.

The assembly zone sensor S4 and the assembly zone sensor S5 serves to inform the controller C that produce has arrived and is present in the assembly zones SA1 and SA2, respectively.

It will be appreciated that while various system components, for example the camera 84 and orientation zone support 96 are described and shown as being supported upon the top frame, in alternative embodiments, these components may be supported in other ways, for example upon the bottom frame and using a suitable gantry to position the components above the conveyor where required.

Exemplary Protocol Sequences

Protocol Sequence for 3-Unit Pack

Figure 12:
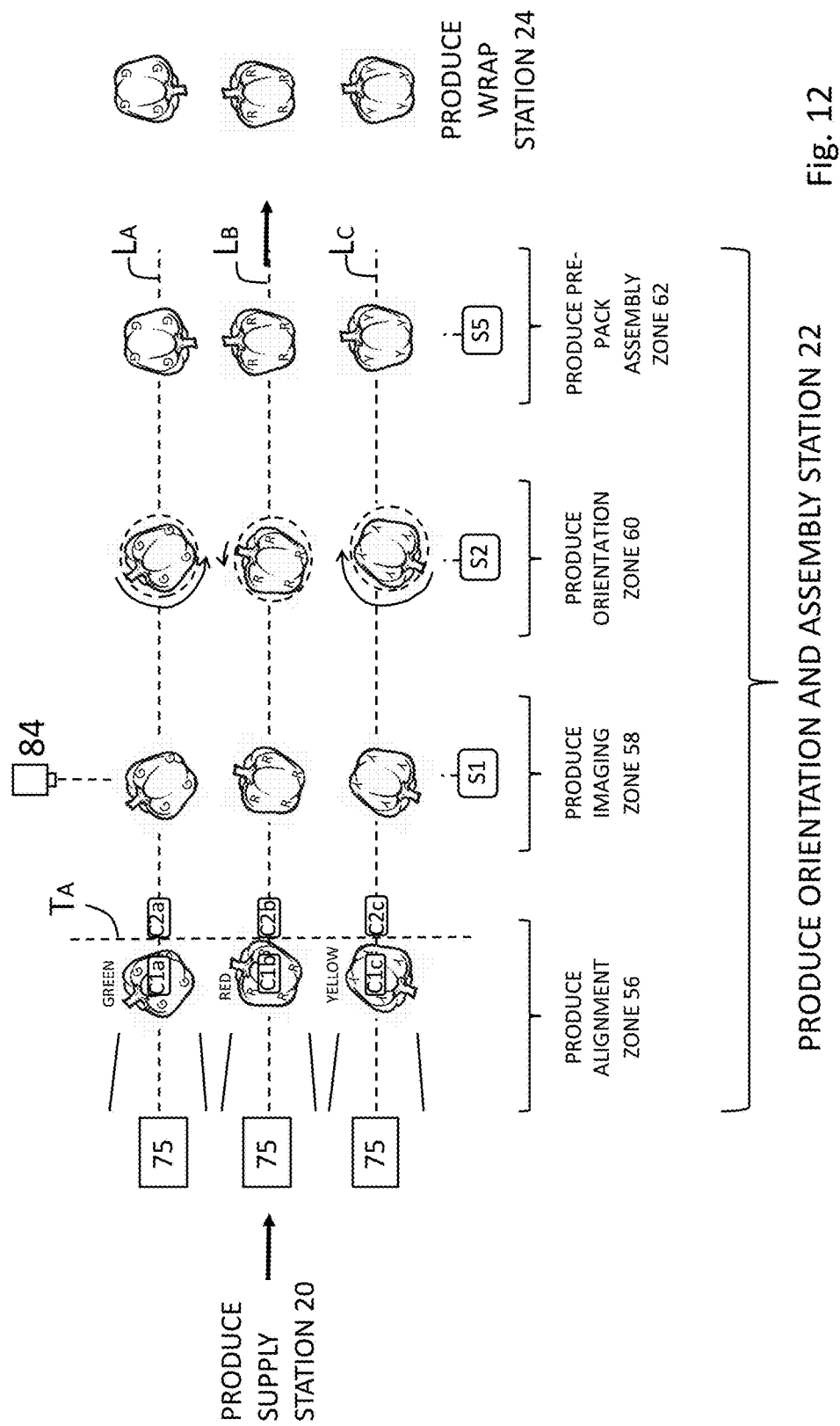
FIG. 12 is an exemplary packaging sequence for a 3-unit pack using the produce pack arrangement system according to FIG. 1.

Presented in FIG. 12 is a protocol sequence for a 3-unit pack arrangement. In this operation, produce is delivered via the produce supply station 20 to the produce orientation and assembly station 22. The supply of produce via each of the produce supply chutes 26 (26a, 26b, 26c) is confirmed by the respective presence cameras 75 provided to inspect each produce chute 26. The conveyor 32 of each produce supply chute 26 continues to operate under control of the controller C until the respective presence camera 75 for that produce supply chute registers the presence of produce, therein establishing the correct produce count (i.e. 3 units) for the assembly process. The produce in an arrangement of 3 units (exemplified as a green G, red R and yellow Y pepper) transfers via the produce drop dampener 38 from the produce supply station 20 onto the conveyor assembly 66 of the assembly station 22. The produce proceeds first through the produce alignment zone 56. The produce proceeds to abut against the first alignment gate 76 and position along the transverse axis TA. Detection by the pair of presence cameras set for each alignment line (presence cameras C1a/C1b for alignment line LA, presence cameras C2a/C2b for alignment line LB, presence cameras C3a/C3b for alignment line Lc) serves to ensure the positioning and presence (and thus the correct count) of produce at the first alignment gate 76. On positive detection of the required count, the controller C activates the first alignment gate 76 to retract (horizontally and vertically) to release the produce. The produce then proceeds to the produce imaging zone 58.

Detection at the imaging zone sensor S1 triggers the controller C to activate the camera 84 to capture an image of the incoming produce. With the image data, the controller C determines the orientation of the produce and calculates the rotation required to orient the produce to a desired predetermined arrangement. Once imaged, the produce then proceeds to the produce orientation zone 60. Detection at the orientation zone sensor S2 triggers the controller C to activate the second alignment gate 86 and the orientation elements. Each orientation element (i.e. orientation brushes 88) is independently controlled by the controller C, and imparts rotation upon the produce to orient the produce into the desired predetermined orientation. On performing the required rotation to achieve the required orientation, the produce is released from the orientation zone 60 and proceeds into the staging assembly 108 of the produce pre-pack assembly zone 62. Based on the desired packing arrangement (i.e. 3 pack, 4-pack, 6-pack, etc.), the produce is delivered to the appropriate staging area. For a 3-pack arrangement, the produce is transported into the staging area SA1. The assembly zone SA1 sensor S5 informs the controller C of when the produce is present in the staging area SA1. With the produce arranged as desired in staging area SA1, the staging assembly 108 moves the oriented and assembled grouping of produce in the first direction (transverse to the longitudinal axis) to arrange the 3-unit set of produce into a more condensed in-line arrangement, and then longitudinally in the direction of the produce packaging delivery station 24.

Protocol Sequence for 6 Unit Pack

Figure 13:
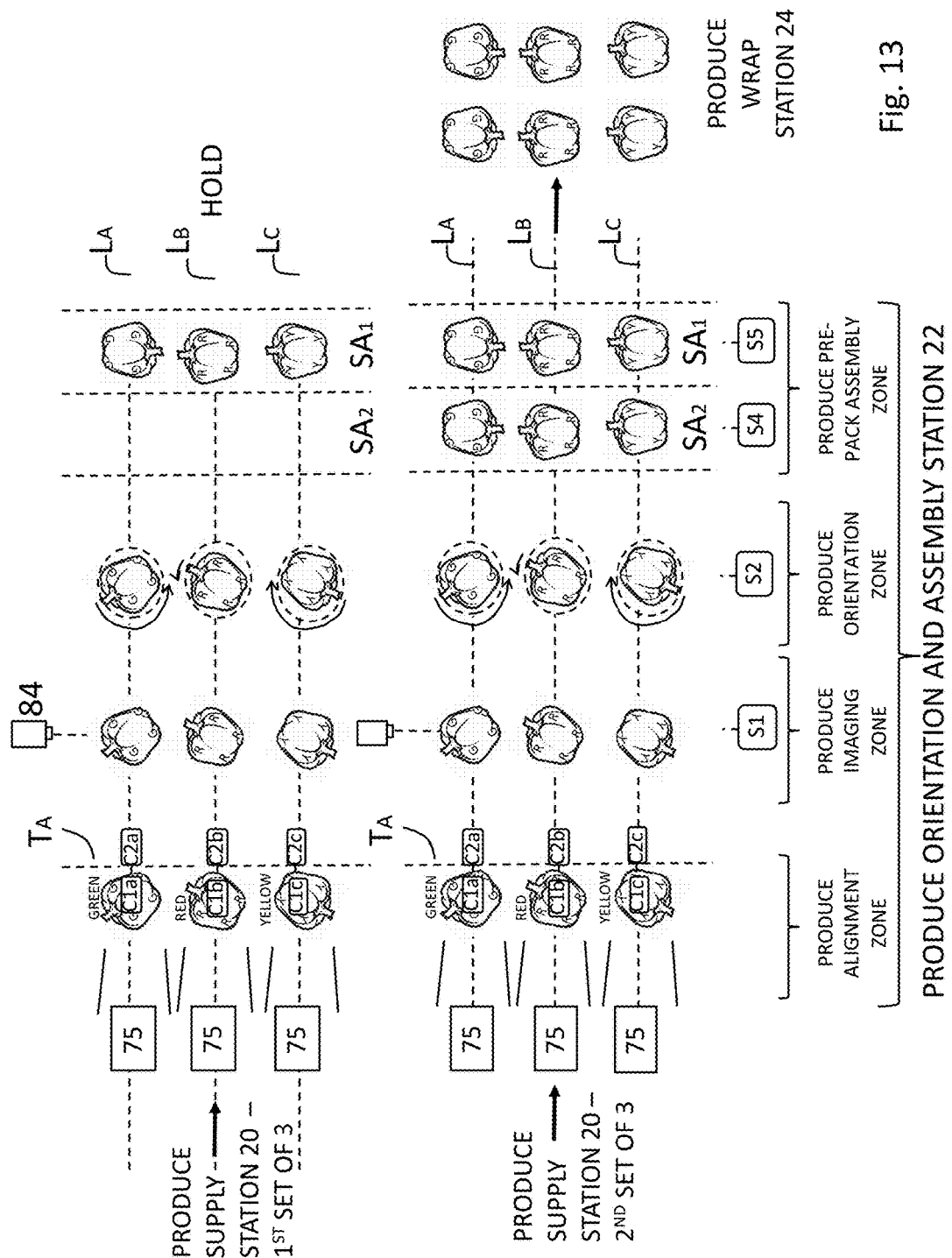
FIG. 13 is an exemplary packaging sequence for a 6-unit pack using the produce pack arrangement system according to FIG. 1.

Turning now to FIG. 13, the protocol sequence for a 6-unit pack is generally the same as that described above for the 3-unit pack. Where a 6-unit pack is desired, once a set of 3 units of produce are staged in staging area SA1, the controller C instructs the staging assembly 108 to hold until 3 more units of produce are processed through the system and arranged in staging area SA2. The treatment of the second set of produce is substantially the same as that described with respect to the first set of produce set in staging area SA1. The assembly zone SA2 sensor S4 informs the controller C of when the second set of produce is present in the staging area SA2. With the produce arranged as desired in staging areas SA1 and SA2, the staging assembly 108 moves the oriented and assembled grouping of produce in the first direction (transverse to the longitudinal axis) to arrange the 2 3-unit sets of produce into a more condensed 2×3 arrangement, and then longitudinally in the direction of the produce packaging delivery station 24.

Protocol Sequence for 4 Unit Pack

Figure 14:
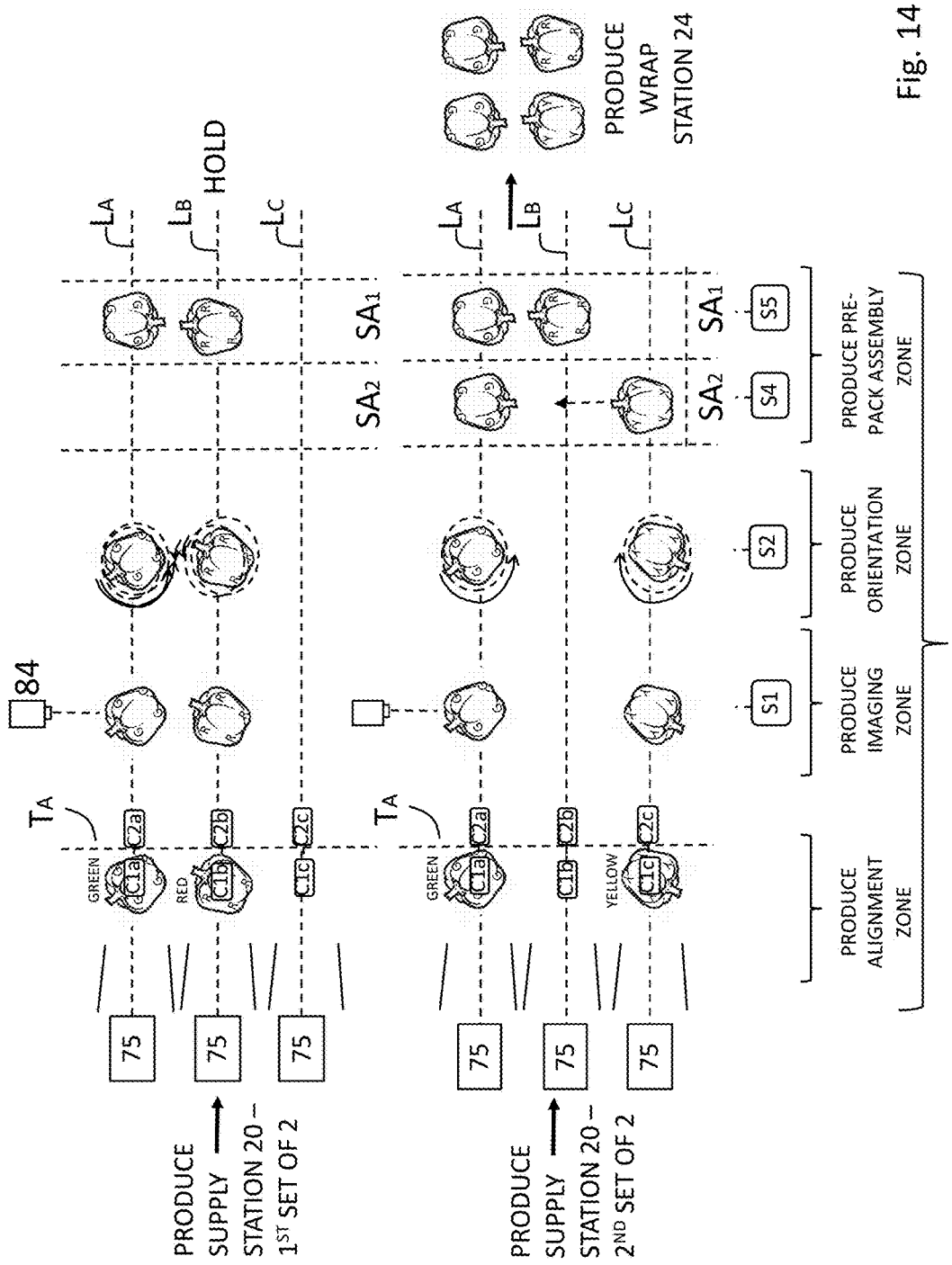
FIG. 14 is an exemplary packaging sequence for a 4-unit pack using the produce pack arrangement system according to FIG. 1.

Turning now to FIG. 14, although the protocol sequence for a 4-unit pack runs through two cycles similar to that detailed above for the 6-unit pack, there are differences specific to achieve the 4-unit pack arrangement. In a 4-unit pack protocol, only two supply chutes 26 are activated during each cycle to supply produce from the produce supply station 20. In the exemplary protocol shown, in the first cycle, only supply chutes 26a and 26b are activated (therein supplying a green pepper from supply chute 26a and a red pepper from supply chute 26b). The processing of the 2-unit set of produce through the assembly station 22 is generally the same as described above for the 3-unit pack.

The second cycle provides the second 2-unit set of produce, in this case a green pepper supplied via supply chute 26a, and a yellow pepper supplied via supply chute 26c. Once again, the 2-unit set of produce proceeds through the assembly station 22 as described above until registered as present in the staging area SA2. With the produce arranged as desired in staging areas SA1 and SA2, the staging assembly 108 moves the oriented and assembled grouping of produce in the first direction (transverse to the longitudinal axis) to arrange the 2 2-unit sets of produce into a more condensed 2×2 arrangement, and then longitudinally in the direction of the produce packaging delivery station 24.

The produce pack arrangement system 10 has been exemplified as having orientation brushes 88 used for the orientation elements. Where the orientation elements are presented in the form of grippers, the orientation elements may be arranged to permit for both rotational adjustment as well as longitudinal and transverse movement of the produce on the assembly station 22. In such an arrangement, the grippers would be configured to grip the produce and subject them to the required rotational adjustment to achieve the desired orientation. The grippers would also be operably associated with a suitable actuator assembly that permits the grippers to move both longitudinally as well as transversely to position the produce in an arranged manner ready for the produce packaging delivery station 24.

The produce pack arrangement system 10 has been exemplified as a single unit receiving produce and arranging the produce into 3-, 4-, or 6-unit packs for delivery to a packaging apparatus (i.e. a flow wrap packaging apparatus). It will be appreciated that in some packaging operations, multiple pack arrangement systems 10 may be used. In such an arrangement, the produce orientation and assembly station 22 of each pack arrangement system 10 would deliver arranged produce to a common produce packaging delivery station 24. In such an arrangement, a first produce pack arrangement system 10 could provide a 3-unit pack of tomatoes, while a second produce pack arrangement system couple provide a 3-unit pack of cucumbers.

It will be appreciated that the produce supply station 20, the assembly station 22 and the produce packaging delivery station 24 may be provided as modular units, permitting for customization and rearrangement of the component stations as required. For example, where these stations are provided as modular units, a station can be quickly removed and repaired/replaced in the event of component failure. It may also be possible to assemble the modular units in such a way that the produce supply station 20 directly feeds the produce packaging delivery station 24, for example when produce orientation is not a required packaging step. For example, where tomatoes are being packaged, and there is no requirement to have the tomatoes arranged in a preset orientation, the produce supply station 20 may be used to provide the required count, after which the set group of tomatoes would be released directly to the produce packaging delivery station 24 for packaging. In some embodiments, only the produce orientation and assembly station may be provided. The customization and rearrangement of the modular units provides the advantage of greater handling flexibility for a wide range of produce.

The disclosed produce pack arrangement system 10 has the advantage of enabling the orientation and assembly of produce for a desired packing arrangement without direct human manual manipulation. Stated differently, the produce pack arrangement system 10 permits for an automated "hands-off" or "touch-free" orientation and assembly of produce. Reducing the extent of human contact with food has the benefit of reducing costs associated with training and staffing suitable personnel. Reducing human contact with food also has the benefit of reducing potential contamination associated with direct human handling.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. A produce pack arrangement system comprising:
a produce supply station 20 including a plurality of produce supply chutes extending from a feeder supply end 28 to a feeder discharge end 30,
a produce orientation and assembly station 22, and
a produce packaging delivery station 24,
wherein the produce orientation and assembly station 22 is configured to receive produce from the produce supply station 20 and orient a set group of produce according to a desired predetermined arrangement prior to release to the produce packing delivery station 24,
wherein the produce orientation and assembly station 22 includes a produce alignment zone having a stationary centering fixture positioned to receive produce from a respective produce supply chute and arrange the produce on a respective longitudinal alignment line, and
wherein the produce alignment zone also includes a produce alignment gate to align the set group of produce on adjacent longitudinal alignment lines along a transverse axis.

2. The produce pack arrangement system according to claim 1, wherein each of the plurality of produce supply chutes is provided with an independently controlled conveyor.

3. The produce pack arrangement system according to claim 1, wherein the produce orientation and assembly station includes a conveyor assembly to carry the produce from an assembly supply end to an assembly discharge end of the produce orientation and assembly station.

4. The produce pack arrangement system according to claim 1, wherein the produce orientation and assembly station includes a produce imaging zone having a camera to digitally image and detect the orientation of produce received from the produce alignment zone.

5. The produce pack arrangement system according to claim 4, wherein the produce orientation and assembly station includes a produce orientation zone having an orientation alignment gate configured to position the set group of produce under a respective orientation element.

6. The produce pack arrangement system according to claim 5, wherein the orientation element is provided in the form of a rotatable orientation brush, the rotatable orientation brush being configured to rotate the produce to a desired orientation from a starting orientation as determined in the produce imaging zone.

7. The produce pack arrangement system according to claim 6, wherein the produce orientation and assembly station includes a produce assembly zone configured to receive produce from the produce orientation zone, the produce assembly zone including a staging assembly to arrange and move the produce in both a longitudinal direction towards the produce packaging delivery station and transversely thereto.

8. The produce pack arrangement system according to claim 7, wherein the staging assembly includes a transverse end stop, at least one transverse staging member and at least one longitudinal push member.

9. The produce pack arrangement system according to claim 8, wherein the staging assembly includes a first, second, third and forth staging member, and wherein the end stop and the first, second, third and forth staging member are arranged in spaced-apart relationship to define a gap-spacing therebetween, and wherein the first, second, third and forth staging members are provided as bristle brushes having sufficient stiffness to retain and impart motion in the produce during longitudinal movement.

10. The produce pack arrangement system according to claim 9, wherein the bristle brush forming the first and third staging members are shorter in relation to the bristle brush forming the second and forth staging members, and wherein the first and third staging members are configured to engage the top-side of the produce, while the second and forth staging members are configured to engage the side of the produce.

11. A produce orientation and assembly station, comprising:
   an assembly supply end configured to receive a set group of produce,
   an assembly discharge end configured to discharge the set group of produce to a subsequent produce packaging delivery station,
   a conveyor assembly arranged to carry the set group of produce from the assembly supply end to the assembly discharge end,
   an orientation zone including an orientation element configured to rotate each item of produce in the set group of produce to a desired orientation, and
   a produce assembly zone including a staging assembly to move and arrange the set group of produce according to a preselected pack arrangement, the staging assembly being configured to discharge the set group of produce, once arranged, from the assembly discharge end to the subsequent produce packaging delivery station,
   a produce alignment zone proximal the assembly supply end, the produce alignment zone having a stationary centering fixture positioned arrange each item of produce of the set group of produce on a respective longitudinal alignment line, and wherein the produce alignment zone also includes a produce alignment gate to align the set group of produce on adjacent longitudinal alignment lines along a transverse axis.

12. The produce orientation and assembly station of claim 11, further comprising a produce imaging zone having a camera to digitally image and detect the orientation of produce received from the produce alignment zone.

13. The produce orientation and assembly station of claim 11, wherein the produce orientation zone includes an orientation alignment gate configured to position each item of produce of the set group of produce under a respective orientation element.

14. The produce orientation and assembly station of claim 11, wherein the orientation element is provided in the form of a rotatable orientation brush.

15. The produce orientation and assembly station of claim 11, wherein the staging assembly is configured to move the produce in both a longitudinal direction towards the assembly discharge end and transversely thereto.

16. The produce orientation and assembly station of claim 11, wherein the staging assembly includes a transverse end stop, at least one transverse staging member and at least one longitudinal push member.

17. The produce orientation and assembly station of claim 16, wherein the staging assembly includes a first, second, third and forth staging member, and wherein the end stop and the first, second, third and forth staging member are arranged in spaced-apart relationship to define a gap-spacing therebetween, and wherein the first, second, third and forth staging members are provided as bristle brushes having sufficient stiffness to retain and impart motion in the produce during longitudinal movement.

* * * * *

UNITED STATES PATENT AND TRADEMARK OFFICE
CERTIFICATE OF CORRECTION

PATENT NO. : 10,023,336 B2
APPLICATION NO. : 15/232314
DATED : July 17, 2018
INVENTOR(S) : Diogenes M. Gomez It is certified that error appears in the above-identified patent and that said Letters Patent is hereby corrected as shown below:

In the Claims

Column 15-16 Claim 11 should read:
11. A produce orientation and assembly station, comprising:
    an assembly supply end configured to receive a set group of produce,
    an assembly discharge end configured to discharge the set group of produce to a subsequent produce packaging delivery station,
    a conveyor assembly arranged to carry the set group of produce from the assembly supply end to the assembly discharge end,
    an orientation zone including an orientation element configured to rotate each item of produce in the set group of produce to a desired orientation, and
    a produce assembly zone including a staging assembly to move and arrange the set group of produce according to a preselected pack arrangement, the staging assembly being configured to discharge the set group of produce, once arranged, from the assembly discharge end to the subsequent produce packaging delivery station,
    a produce alignment zone proximal the assembly supply end, the produce alignment zone having a stationary centering fixture positioned to arrange each item of produce of the set group of produce on a respective longitudinal alignment line, and wherein the produce alignment zone also includes a produce alignment gate to align the set group of produce on adjacent longitudinal alignment lines along a transverse axis.

Signed and Sealed this
Sixth Day of November, 2018

Andrei Iancu
*Director of the United States Patent and Trademark Office*